United States Patent [19]
Bernard et al.

[11] Patent Number: 5,639,293
[45] Date of Patent: Jun. 17, 1997

[54] METHOD AND APPARATUS FOR PRODUCTION OF IRON FROM IRON COMPOUNDS

[75] Inventors: Johannes G. Bernard, Delft; Hendrikus K. A. Meijer, Uitgeest; Cornelis P. Teerhuis, Marken, all of Netherlands

[73] Assignee: Hoogovens Staal B.V., Ijmuiden, Netherlands

[21] Appl. No.: 490,900

[22] Filed: Jun. 16, 1995

[30] Foreign Application Priority Data

Jul. 1, 1994 [NL] Netherlands ............. NL 9401103

[51] Int. Cl.$^6$ ................................................ C21B 13/12
[52] U.S. Cl. ................................... 75/453; 266/182
[58] Field of Search ........................ 75/453; 266/182

[56] References Cited

U.S. PATENT DOCUMENTS

| | | | |
|---|---|---|---|
| 2,540,593 | 2/1951 | Ogorzaly | 75/38 |
| 3,607,224 | 9/1971 | Blaskowski | 75/26 |
| 4,087,274 | 5/1978 | Edenwall et al. | 75/10 |
| 5,228,901 | 7/1993 | Taylor et al. | 75/453 |

FOREIGN PATENT DOCUMENTS

| | | |
|---|---|---|
| 1314435 | 12/1962 | France . |
| 0442776 | 4/1992 | Germany . |
| 7607352 | 1/1979 | Netherlands . |
| 0827957 | 2/1960 | United Kingdom . |

OTHER PUBLICATIONS

J. van Langen et al, "Single Vessel Smelting Reduction Using Cyclone Pre-Reducer", Steel Times International, (1993) Mar., No. 2, Redhill, Surrey, GB.

*Primary Examiner*—Melvyn Andrews
*Attorney, Agent, or Firm*—Watson Cole Stevens Davis, P.L.L.C.

[57] ABSTRACT

A method and apparatus for production of iron from iron compounds is provided. There is a first stage of pre-reducing the iron compounds in a first chamber having a rotationally symmetrical wall, and a second stage of further reducing the iron compounds in a second chamber below the first chamber, fuel and oxygen being supplied to the second chamber. A reducing gas passes upwardly into the first chamber to effect the pre-reduction therein. Oxygen is fed to the first chamber. The iron compounds in the first chamber at least partly melt and then flow downwardly along the wall towards said second chamber. The iron compounds are introduced into the first chamber in particle form and by means of a carrier gas which provides one or more jets. The oxygen is fed into the first chamber at least partly in the form of one or more jets having tangential components. The velocity of introduction of the oxygen is greater than the velocity of introduction of the iron compounds in the jets thereof, while the velocity of introduction of the iron compounds is such that the particles reach the wall of the first chamber in an at least partly molten state.

25 Claims, 3 Drawing Sheets

000
METHOD AND APPARATUS FOR PRODUCTION OF IRON FROM IRON COMPOUNDS

BACKGROUND OF THE INVENTION

1. Field of the Invention

The invention relates to a method of production of iron, particularly pig iron, from iron compounds by a two-stage process of first pre-reducing the iron compounds in a first chamber with a rotationally symmetrical wall and a vertical axis, and secondly further reducing the iron compounds in a second chamber located beneath the first chamber. In the second chamber the further reduction of the iron compounds takes place with fuel and oxygen being supplied to the second chamber to produce a reducing gas which passes upwardly into the first chamber to effect the pre-reduction there. Oxygen is supplied to maintain a combustion in the reducing gas in the first chamber, so that the iron compounds at least partly melt and pass down into the second chamber. The invention also relates to an apparatus for carrying out this method.

2. Description of the Prior Art

A method and apparatus of this type is known from NL application 257,692 (to which FR-A-1314435 corresponds). A similar disclosure is in Steel Times International, GB, 1993, March No. 2, page 24. The first, upper chamber is known as a melting cyclone or cyclone pre-reducer. Other two-stage processes for pre-reducing iron compounds are also known, such as for example a process in a fluidized bed reactor. However, the pre-reduced iron compounds from the fluidized bed in that process are introduced in solid state into a metallurgical vessel, the so-called melting reactor. This places high demands on the post-combustion of the reaction gases in the melting reactor required for creating the necessary heat in the melting reactor. The melt is only partly helped by this heat which is released above the melt. In the process of the type of the present invention, however, the post-combustion can take place in the first chamber and the heat released from this transfers directly to the iron compounds.

The present inventors have studied this type of process and have obtained a new and deeper insight into this technology.

SUMMARY OF THE INVENTION

The object of the invention is to provide an improved and easily practised method and apparatus production of iron from iron compounds, and particularly for pre-reducing iron compounds in a melting cyclone.

According to the invention there is provided a method of production of iron from iron compounds comprising the two stages of (a) pre-reducing the iron compounds in a first chamber having a wall which is substantially rotationally symmetrical about an axis, (b) further reducing the iron compounds in a second chamber below the first chamber, fuel and oxygen being supplied to the second chamber so that there is produced therein a reducing gas which passes upwardly into the first chamber to effect the pre-reduction, wherein said iron compounds and oxygen are introduced into the first chamber so that the oxygen maintains a combustion in said first chamber, with the effect that the iron compounds in the first chamber at least partly melt and then flow downwardly along said wall of said first chamber towards said second chamber.

This process is characterised by (i) introducing the iron compounds into the first chamber in particle form and by means of a carrier gas which provides one or more jets of the iron compounds into the first chamber, (ii) introducing the oxygen into the first chamber at least partly in the form of one or more jets separately from the jet or jets of the iron compounds, (iii) the velocity of introduction of the oxygen in the jet or jets thereof being greater than the velocity of introduction of the iron compounds, (iv) the direction of the jet or jets of oxygen having a tangential component so that the reducing gas is given a rotating motion around the axis of the first chamber, and (v) the velocity of introduction of the iron compounds being such that said particles thereof reach the wall of the first chamber in an at least partly molten state.

The combination of these measures is of importance to the method. The iron compounds and the oxygen must be introduced separately into the first chamber so that they are able to have different velocities. The velocity of introduction of the oxygen is preferably at least 50 m/s and more preferably at least 100 m/s. By contrast the velocity of the iron compounds is preferably in the range from 5 to 40 m/s. At a lower velocity of the iron compounds, a larger part of the iron compounds may not reach the wall of the first chamber, while at a higher velocity of the iron compounds the life of the wall may be excessively shortened. However, the velocity of the oxygen must be higher and have a tangential component in order to put the reducing gas in a rotating motion by momentum transfer. This rotating motion is not of equal importance to all iron compound particles alike. The larger and largest particles do reach the wall of the first chamber simply under their own weight. However the smaller and smallest particles tend to be carried along by the reducing gas in an upward axial direction. The rotating motion in the gas centrifuges these particles out so that they are kept in the first chamber. This ensures that the iron compounds are captured very efficiently.

In order to make the process run optimally, the iron compounds and the oxygen are preferably each introduced into the first chamber as a plurality of jets preferably distributed over the height of the first chamber. This ensures intensive utilisation of the volume of the first chamber.

Furthermore, it is preferable that a jet of iron compounds and a jet of oxygen are caused to cross close to or intersect one another in the first chamber, such that, at the crossover point or intersection of the jets of oxygen and iron compounds, there is a hot spot in the combustion of the reducing gas for the jet of iron compounds, where combustion heat is transferred at least in part to the iron compounds, so that the iron compounds melt at least partly. This enhances the pre-reduction of the iron compounds both by chemical reduction of the iron compounds, and possibly also by thermal decomposition.

The mean axial velocity of the reducing gas in its upward passage through the first chamber is preferably at least 5 m/s. The pressure (absolute pressure) in the first chamber is preferably in the range 1–6 bar(0.1 to 0.6 MPa). This intensifies the process in the first chamber.

Preferably no extra fuel is supplied to the first chamber. It has been found that, although extra fuel supplied to the first chamber in addition to the reducing gas does combust in the first chamber, the degree of combustion of the process gas from the second chamber tends to drop. Therefore, on balance, the extra fuel does not contribute any benefit to the pre-reduction process.

The iron compounds preferably have an average grain size in the range 0.05 to 5 mm. The advantage of this is that natural ore concentrate as supplied by ore mines may be used, and not a particular fraction of the concentrate.

The carrier gas for the iron compounds is preferably oxygen. This enhances the pre-reduction process.

It is preferable to introduce the iron compounds low down in the first chamber, for example so that more of the iron compounds are introduced into the bottom half of the first chamber than into the top half. This keeps the capture efficiency high.

The invention also provides apparatus for production of iron, particularly for use in carrying out the method described above, having (i) a first chamber having a wall which is substantially rotationally symmetrical about a substantially vertical axis, (ii) means for supplying iron compounds and oxygen into the first chamber, (iii) a discharge conduit for discharging process gases from the first chamber, (iv) a second chamber arranged beneath the first chamber and in open communication therewith for upward flow of process gases into the first chamber and downward passage of molten iron compounds from the wall of the first chamber into the second chamber, (v) means for supplying fuel and oxygen into the second chamber.

This apparatus is characterised in that the means for supplying iron compounds and oxygen into the first chamber comprises a plurality of first nozzles for providing jets of the iron compounds in the form of particles entrained by carrier gas and a plurality of second nozzles for providing jets of oxygen separately from said jets of iron compounds, the first and second nozzles being located in the wall of said first chamber, and at least one of the second nozzles providing a jet of oxygen having a tangential component, relative to the first chamber axis.

This construction ensures high utilisation of the first chamber.

Preferably the first chamber is substantially circular cylindrical with a height to diameter ratio of at least 1 and preferably at least 2. It has been found that, particularly when the axial velocity of the reducing gas in the first chamber is high, a greater height to diameter ratio leads to a better capture efficiency.

Preferably the first nozzles for supplying iron compounds are placed at different heights in the wall of the first chamber. At each height level there is preferably a group consisting of two first nozzles which are located at diametrically opposed places of the wall of the first chamber and provide jets whose directions are substantially horizontal, are in the same rotational direction with respect to the axis of the first chamber and are tangential to an imaginary circle having a diameter in the range 0.25 to 0.75 times the diameter of the first chamber. Thus the first nozzles may be arranged along a plurality of imaginary helices on the wall of the first chamber. The first nozzles of each group are preferably circumferentially staggered around the axis by 120° with respect to the first nozzles of each neighbouring group.

This pattern of the nozzles for the iron compounds means that a large quantity of iron compounds can be introduced into the first chamber, the jets do not interfere, and a pre-reduction with a high production output is obtained.

Preferably the second nozzles for supplying oxygen are likewise distributed at different heights in the wall of the first chamber. The second nozzles are preferably arranged in groups at a plurality of height levels and respectively associated with the above-mentioned groups of first nozzles, with each group of the second nozzles located in the wall of the first chamber at the same height level or slightly lower than the associated group of first nozzles. Likewise also each group of second nozzles preferably consists of two second nozzles which are located at diametrically opposed places of the wall of the first chamber and provide jets whose directions are substantially horizontal, are in the same rotational direction with respect to the axis of the first chamber and are tangential to an imaginary circle having a diameter in the range 0.25 to 0.75 times the diameter of the first chamber.

The imaginary circle for the second nozzles is preferably smaller than the imaginary circle for the first nozzles.

Harmonising the supply pattern of the oxygen with the supply pattern of the iron compounds in this manner achieves a good transfer of heat to the iron compounds, a good degree of pre-reduction and a good capture efficiency.

Discharge of the process gases is preferably through a discharge conduit substantially coaxial with the first chamber. This prevents blockages.

The first and second chambers are preferably substantially coaxial. This makes the construction of the installation simple.

Conventional iron ore concentrates in particle form may be used as the iron compounds. Other iron-containing material, such as dusts produced in the steel industry, may be added.

BRIEF DESCRIPTION OF THE DRAWINGS

An embodiment of the invention will now be described by way of non-limitative example, with reference to the accompanying drawings, in which.

DESCRIPTION OF THE PREFERRED EMBODIMENT

Figure 1:
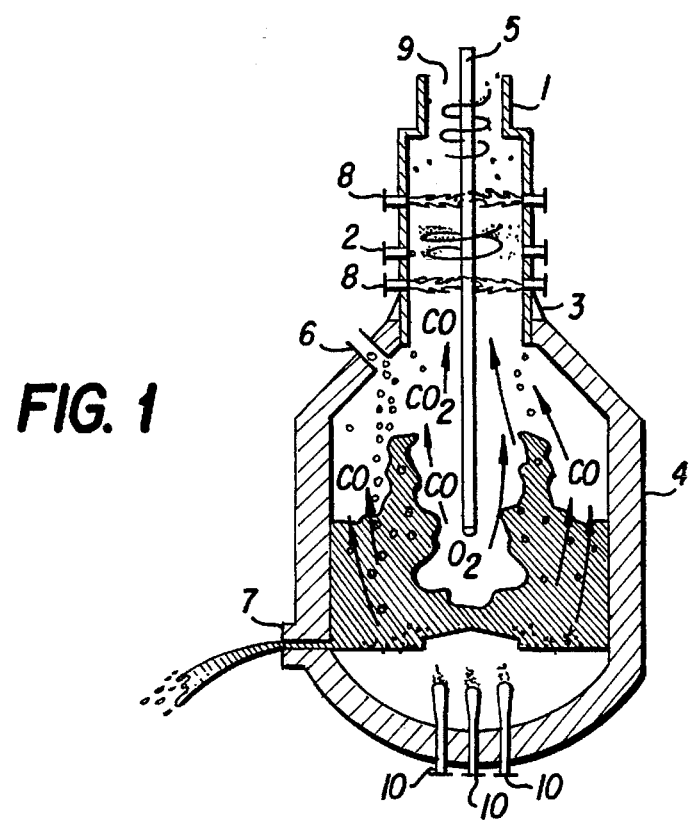
FIG. 1 shows diagrammatically an apparatus according to the invention for the manufacture of pig iron, with a melting cyclone.

In the melting cyclone 1 of FIG. 1 iron compounds are introduced via nozzles 2 in particle form entrained by oxygen as a carrier gas. The iron compounds are pre-reduced in the melting cyclone 1 and flow down along the wall 3 of the melting cyclone 1 and drip into the lower metallurgical vessel 4, which is for example a converter. In this vessel 4, oxygen is supplied by means of a lance 5 and fuel, for example coal, is supplied through the opening 6, and the iron compounds are further reduced into pig iron which is then tapped off through an opening 7 together with the slag formed. During the further reduction of the iron compounds in the metallurgical vessel 4 a hot gas containing CO (and H$_2$) is produced, which passes to the melting cyclone 1. In the melting cyclone, with oxygen supplied through the nozzles 8, a combustion takes place, whereby the iron compounds are pre-reduced. The process gas is then discharged through a conduit 9 on the top of the melting cyclone. A small part of the iron compounds is unavoidably carried along with the gas. FIG. 1 also shows the possibility of agitating the melt at the bottom of the metallurgical vessel 4 by bottom bubbling by introducing an inert gas such as argon through openings 10 in the bottom of the vessel.

Figure 2:
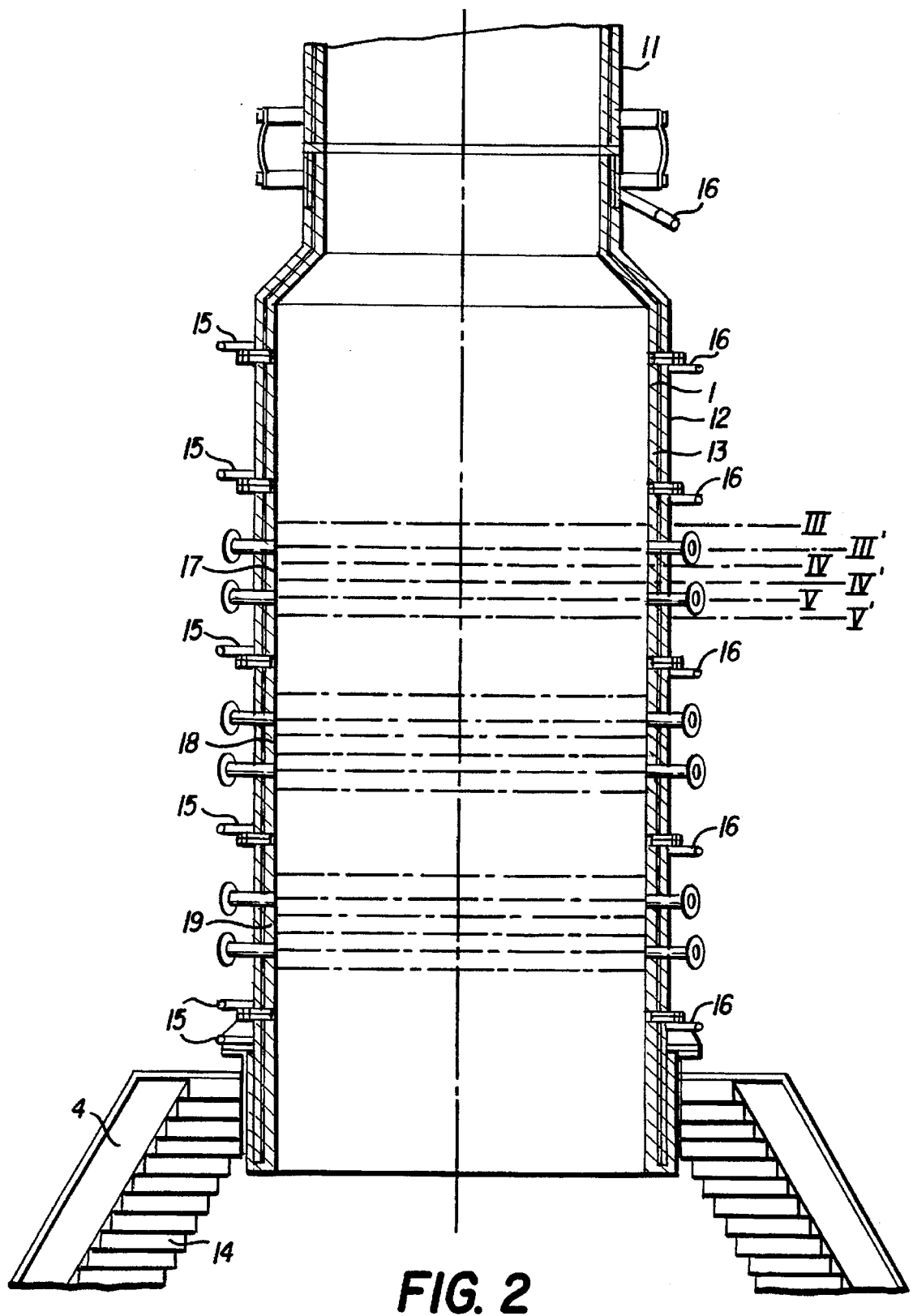
FIG. 2 shows in more detail the melting cyclone of FIG. 1.

FIG. 2 shows that the melting cyclone has a height to diameter ratio of over 2. The melting cyclone has a circular cylindrical chamber which is oriented vertically and coaxially on the metallurgical vessel 4. The melting cyclone has a coaxial outlet 1t forming the discharge conduit 9, has a water-cooled shell 12 and is provided internally with a refractory lining 13. The metallurgical vessel 4 also has a refractory lining 14. The cooling water for the melting cyclone is supplied and discharged by means of nozzles 15 and 16. The melting cyclone is considered to be divided into sections, of which sections 17, 18 and 19 are provided with the nozzles for supplying iron compounds and oxygen.

Figure 3:
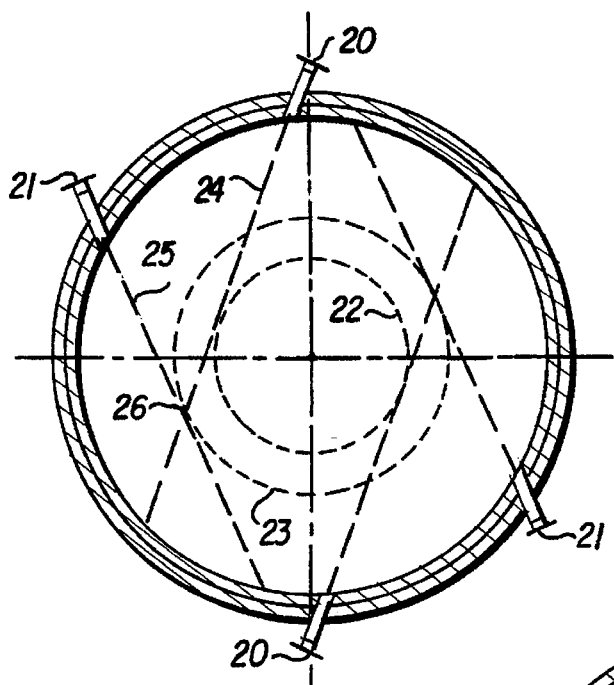
FIG. 3 is a diagram of the cross-section at the planes III–III$^1$ of FIG. 2 of the melting cyclone of FIG. 2.
Figure 4:
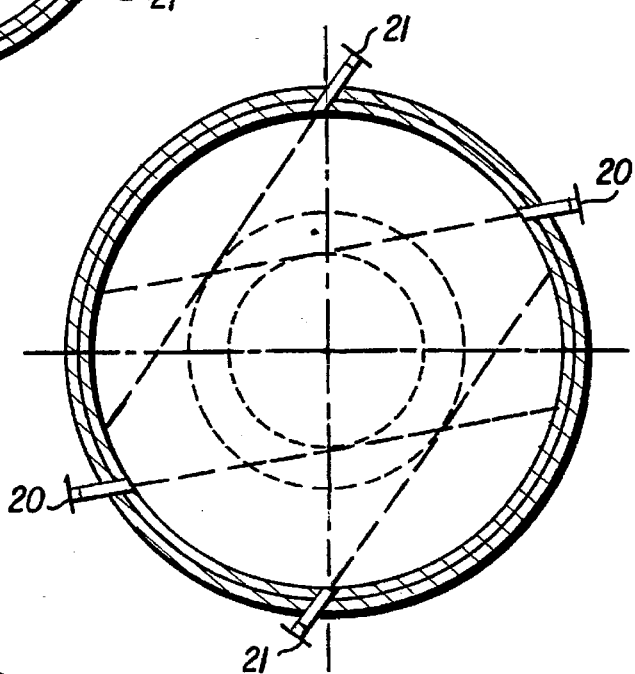
FIG. 4 is a diagram of the cross-section at planes IV–IV$^1$ of FIG. 2.
Figure 5:
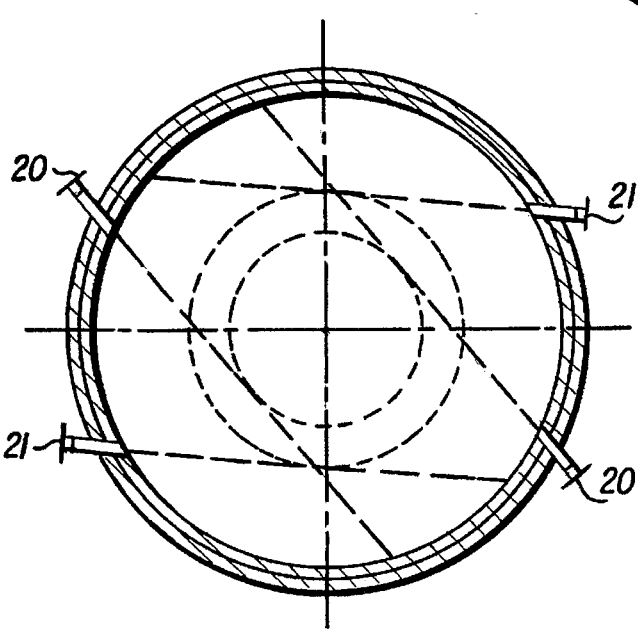
FIG. 5 is a diagram of the cross-section at planes V–V$^1$ of FIG. 2.

First nozzles 20 for supplying iron compounds are located in the wall of the melting cyclone in section 17 in plane III as shown in FIG. 3. In the plane III$^1$ slightly below the plane III, second nozzles 21 for supplying oxygen are located in the wall of the melting cyclone as also shown in FIG. 3. Below the planes III–III$^1$, further nozzles 20 and 21 for supplying iron compounds and oxygen are placed in the planes IV–IV$^1$ and V–V$^1$ respectively as shown in FIGS. 4 and 5 respectively. The pattern of the input nozzles for iron compounds and oxygen of sections 18 and 19 is identical to that of section 17.

FIG. 3 shows that the two first nozzles 20 for supplying iron compounds, also termed a group herein, are placed at diametrically opposed positions in the wall and are aimed in directions, which have tangential components and are in the same rotational direction and both to touch an imaginary circular cylinder 22 coaxial with the melting cyclone. This pattern is repeated in FIGS. 4 and 5, it being understood that the nozzles of FIGS. 4 and 5 are staggered through 120° around the axis relative to the nozzles at the next level above or below. In this way the first nozzles for supplying the iron compounds can be seen to be placed on helices up the wall of the melting cyclone.

The pattern of the second nozzles 21 for supplying oxygen corresponds with this. However, the nozzles 21 are placed slightly lower than the nozzles 20 because the oxygen is subject to more lift than the iron compounds due to the axial velocity of the reducing gas in the melting cyclone. The nozzles 21 are likewise aimed in directions which touch an imaginary coaxial circular cylinder 23, which, however, is larger than the imaginary circular cylinder 22.

A jet of iron compounds 24 coming out of a nozzle 20 and a jet of oxygen 2S coming out of nozzle 21 cross or intersect each other at 26 where the oxygen there causes the reducing gas to combust, so that the combustion heat is transferred to the iron compounds and the iron compounds are pre-reduced and melted at least in part, before they reach the vessel wall.

Test Example

Figure 6:
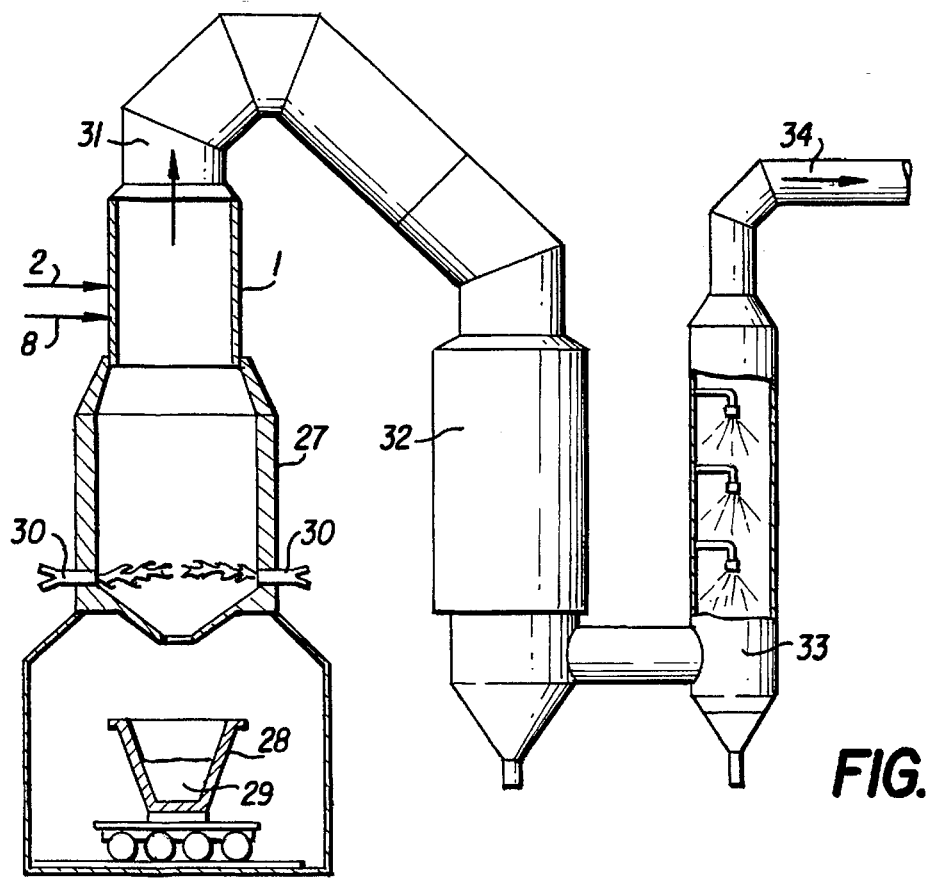
FIG. 6 shows a test apparatus with a melting cyclone in which the operation of the melting cyclone is tested in processes simulating the present invention.

The test apparatus of FIG. 6 consists of the melting cyclone 1 as described above, a combustion chamber 27 and a collecting tank 28 for the reduced iron compounds 29. There is no second metallurgical vessel 4 in this test arrangement, which is used to simulate the conditions of the two-stage reduction process of the invention. In the combustion chamber 27 natural gas and oxygen introduced through openings 3 is combusted to produce a reducing gas with a temperature of approximately 1,500° C. and a composition which is comparable with that produced in the second metallurgical vessel in an actual process. In the melting cyclone iron compounds and oxygen are introduced through the nozzles 2 and 8. Dust-charged waste gas is discharged according to arrow 31. The waste gas is burned up in a combustion chamber 32 and then cooled with water and cooler 33 and discharged to a gas scrubber according to arrow 34.

The test arrangement of FIG. 3 was used to test the operation of the melting cyclone in accordance with FIG. 2. The dimensions of the melting cyclone were 2,000 mm net internal diameter by a height of some 4,000 mm. The axial velocity of the reducing gas in the smelting cyclone was 5 m/s. Carol Lake iron ore concentrate with an iron content of 66% wt. and a particle size of 50–500 µm was supplied at a velocity of 10 m/s and oxygen at a velocity ranging from 100 to 200 m/s. The degree of reduction defined as $$\left\{ 1 - \frac{[O] \text{ content in the product 29}}{[O] \text{ content in the iron compounds supplied}} \right\} \times 100\%$$

was 10 to 30%.
The capture efficiency defined as $$\frac{\text{Fe in the product 29 [kg]}}{\text{Fe introduced into the melting cyclone [kg]}} \times 100\%$$

was 90 to 95%.

The output of the melting cyclone was approximately 20 ton/h.

What is claimed is:

1. A method of production of iron from iron compounds, comprising the two stages of
   (a) pre-reducing the iron compounds in a first chamber having a wall which is substantially rotationally symmetrical about an axis of said first chamber, and causing the iron compounds pre-reduced in said first chamber to transfer by gravity into a second chamber below said first via an opening connecting said first and second chambers,
   (b) further reducing the iron compounds in a second chamber below said first chamber and in communication therewith, by supplying fuel and oxygen to said second chamber so that in said second chamber there is produced a reducing gas which passes upwardly into said first chamber via said opening connecting said first and second chambers to effect the pre-reduction in said first chamber,
   said method including the steps of
   (i) introducing said iron compounds into said first chamber in particle form and by means of a carrier gas which provides at least one jet of said iron compounds into said first chamber, said at least one jet having a first velocity and having a direction having a tangential component with respect to said first chamber, and
   (ii) introducing oxygen into said first chamber at least partly in the form of at least one jet separately from said at least one jet of said iron compounds, said at least one jet of oxygen having a velocity greater than said first velocity, and the direction of at least one said jet of oxygen having a tangential component so that said reducing gas is given a rotating motion around the axis of said first chamber, whereby said oxygen introduced into said first chamber maintains a combustion with said reducing gas in said first chamber with the effect that said iron compounds in said first chamber at least partly melt and then flow downwardly along said wall of said first chamber towards said second chamber, and said first velocity of introduction of said iron compounds being selected such that said particles thereof reach said wall of said first chamber in an at least partly molten state.

2. A method in accordance with claim 1 in which there is a plurality of said jets of said iron compounds and a plurality of said jets of oxygen into said first chamber.

3. A method in accordance with claim 1 including directing a said jet of said iron compounds and a said jet of oxygen so that they pass one another at a place in said first chamber, so that at said place said combustion of said oxygen and said reducing gas forms a hot spot for said iron compounds at which said iron compounds are at least partly melted.

4. A method in accordance claim 1 wherein said reducing gas has in its upward passage through said first chamber a mean axial velocity of at least 5 m/s.

5. A method in accordance with claim 1 wherein in said first chamber there is a pressure in the range 1 to 6 bar.

6. A method in accordance with claim 1 wherein no additional fuel is supplied to said first chamber.

7. A method in accordance with claim 1 wherein said velocity of introduction of oxygen in said jet thereof is at least 50 m/s.

8. A method in accordance with claim 7 wherein said velocity of introduction of oxygen is at least 100 m/s.

9. A method in accordance with claim 1 wherein said first velocity of introduction of said iron compounds is in the range 5 to 40 m/s.

10. A method in accordance with claim 1 wherein said particles of said iron compounds have an average grain size in the range 0.05 to 5 mm.

11. A method in accordance with claim 1 wherein said carrier gas for said iron compounds is oxygen.

12. A method in accordance with claim 1 wherein at least half of said iron compounds are introduced into the lower half of said first chamber.

13. Apparatus for production of iron from iron compounds, having (i) a first chamber for pre-reduction of said iron compounds, having a wall which is substantially rotationally symmetrical about a substantially vertical axis of said first chamber, (ii) means for supplying iron compounds and oxygen into said first chamber comprising a plurality of first nozzles for providing jets of said iron compounds in the form of particles entrained by carrier gas and a plurality of second nozzles for providing jets of oxygen separately from said jets of iron compounds, said first and second nozzles being located in said wall of said first chamber, at least one said first nozzle providing a said jet of iron compounds having a tangential component with respect to said axis of said first chamber and at least one said second nozzle providing a jet of oxygen having a tangential component with respect to said axis of said first chamber, (iii) a discharge conduit for discharging process gases from said first chamber, (iv) a second chamber for further reduction of said iron compounds arranged beneath said first chamber and in open and direct communication therewith via an opening for upward flow of process gases into said first chamber and downward passage of molten iron compounds from said wall of said first chamber into said second chamber, and (v) means for supplying fuel and oxygen into said second chamber.

14. Apparatus in accordance with claim 13 wherein said wall of said first chamber is substantially of circular cylindrical shape and has a ratio of height to diameter of at least 1.

15. Apparatus in accordance with claim 14 wherein said ratio of height to diameter is at least 2.

16. Apparatus in accordance with claim 13 wherein said first nozzles are distributed at a plurality of different height levels in said first chamber.

17. Apparatus in accordance with claim 16 wherein at each said height level there is a group consisting of two said first nozzles which are located at diametrically opposed places of said wall of said first chamber and provide jets whose directions are substantially horizontal, in the same rotational direction with respect to said axis of said first chamber and tangential to an imaginary circle having a diameter in the range 0.25 to 0.75 times the diameter of said first chamber.

18. Apparatus in accordance with claim 17 wherein said first nozzles are arranged along a plurality of imaginary helices on said wall of said first chamber.

19. Apparatus in accordance with claim 17 wherein said first nozzles of each said group are circumferentially staggered around said axis by 120° with respect to the first nozzles of each neighbouring said group of said first nozzles.

20. Apparatus in accordance with claim 13 wherein said second nozzles are distributed at a plurality of different height levels in said first chamber.

21. Apparatus in accordance with claim 17 wherein said second nozzles are arranged in groups at a plurality of height levels and respectively associated with said groups of first nozzles, each group of said second nozzles being located in said wall of said first chamber at approximately the same height level than the associated group of said first nozzles.

22. Apparatus in accordance with claim 21 wherein each said group of second nozzles consists of two second nozzles which are located at diametrically opposed places of said wall of said first chamber and provide jets whose directions are substantially horizontal, in the same rotational direction with respect to said axis of said first chamber and tangential to an imaginary circle having a diameter in the range 0.25 to 0.75 times the diameter of said first chamber.

23. Apparatus in accordance with claim 22 wherein said imaginary circle for said second nozzles is smaller than said imaginary circle for said first nozzles.

24. Apparatus in accordance with claim 13 wherein said discharge conduit of said first chamber is substantially coaxial with said axis of said first chamber.

25. Apparatus in accordance with claim 13 wherein said second chamber is substantially coaxial with said first chamber.

* * * * *